United States Patent
Drotleff et al.

(10) Patent No.: US 8,895,878 B2
(45) Date of Patent: Nov. 25, 2014

(54) CABLE FEEDTHROUGH

(71) Applicants: Rolf Drotleff, Deckenpfronn (DE); Daniel Mueller, Remseck (DE)

(72) Inventors: Rolf Drotleff, Deckenpfronn (DE); Daniel Mueller, Remseck (DE)

(73) Assignee: Lapp Engineering & Co., Cham (CH)

( * ) Notice: Subject to any disclaimer, the term of this patent is extended or adjusted under 35 U.S.C. 154(b) by 0 days.

(21) Appl. No.: 13/944,644

(22) Filed: Jul. 17, 2013

(65) Prior Publication Data

US 2014/0020950 A1  Jan. 23, 2014

(30) Foreign Application Priority Data

Jul. 20, 2012  (DE) .......................... 10 2012 106 592

(51) Int. Cl.
  *H02G 15/007* (2006.01)
  *H02G 3/18* (2006.01)
  *H02G 3/06* (2006.01)

(52) U.S. Cl.
  CPC .......... *H02G 15/007* (2013.01); *H02G 3/0666* (2013.01); *H02G 3/0675* (2013.01)
  USPC ........... 174/654; 174/652; 174/659; 174/660; 248/49; 248/56; 285/154.1

(58) Field of Classification Search
  CPC . H02G 3/0666; H02G 3/0675; H02G 3/0683; H02G 3/06; H02G 3/0608; H02G 3/0616; H02G 3/0625; H02G 3/22; H02G 3/24; H02G 3/30; H02G 3/0691; H02G 15/007; H02G 15/068; H02G 15/00; H02G 15/02; H02G 15/04; H02G 15/20; H02G 15/24; H05K 9/0018
  USPC ...... 174/654, 652, 74 R, 78, 84 R, 88 C, 650, 174/653, 659, 660, 663, 668, 72 A, 75 R; 285/322, 331, 390, 149.1, 154.1, 285/154.3, 154.4; 138/96 R, 96 T; 248/49, 248/56; 439/320, 567
  See application file for complete search history.

(56) References Cited

U.S. PATENT DOCUMENTS 3,448,430 A * 6/1969 Kelly .......................... 174/75 R
3,833,754 A 9/1974 Philibert
(Continued)

FOREIGN PATENT DOCUMENTS

DE  102008019165 A1  11/2009
DE  102009033948 A1  1/2011
(Continued)

*Primary Examiner* — Angel R Estrada
(74) *Attorney, Agent, or Firm* — Reinhart Boerner Van Deuren P.C.

(57) ABSTRACT

In order, in the case of a cable feedthrough comprising a cable fixing unit with a fixing housing which is provided with a cable fixing member and a holding section as well as a shield contact element making contact with a cable shield of a cable guided through the cable feedthrough, to configure the cable fixing unit as simply and inexpensively as possible, on the one hand, and, on the other hand, to provide an electrically conductive connection between the cable shield and a wall section bearing the cable feedthrough which is as good as possible it is suggested that the cable feedthrough have a mounting unit which can be connected to a wall section of an appliance, that the mounting unit be connectable or connected to the cable fixing unit in a form locking manner and that the mounting unit be designed such that it provides an electrically conductive connection between the shield contact element and the wall section.

20 Claims, 12 Drawing Sheets

(56) References Cited

U.S. PATENT DOCUMENTS

| | | | |
|---|---|---|---|
| 5,942,730 A | 8/1999 | Schwarz et al. | |
| 7,507,907 B2 * | 3/2009 | Mueller et al. | 174/74 R |
| 7,563,993 B2 * | 7/2009 | Drotleff et al. | 174/655 |
| 2008/0073102 A1 | 3/2008 | Mueller et al. | |

FOREIGN PATENT DOCUMENTS

| | | |
|---|---|---|
| DE | 102009055641 A1 | 5/2011 |
| EP | 0930687 A2 | 7/1999 |
| EP | 1022836 A2 | 7/2000 |
| EP | 1783876 A2 | 5/2007 |

* cited by examiner

CABLE FEEDTHROUGH

CROSS-REFERENCE TO RELATED PATENT APPLICATION

This patent application claims the benefit of German application No. 10 2012 106 592.6, filed Jul. 20, 2012, the teachings and disclosure of which are hereby incorporated in their entirety by reference thereto.

BACKGROUND OF THE INVENTION

The invention relates to a cable feedthrough comprising a cable fixing unit with a fixing housing which is provided with a cable fixing member and a holding section as well as a shield contact element which makes contact with a cable shield of a cable which is guided through the cable feedthrough.

Cable feedthroughs of this type are known from the state of the art.

Examples for such cable feedthroughs are, for example, cable glands, as described in EP 1 022 836.

The problem with such cable feedthroughs is, on the one hand, to configure the cable fixing unit as simply and inexpensively as possible and, on the other hand, to provide an electrically conductive connection between the cable shield and a wall section bearing the cable feedthrough which is as good as possible.

SUMMARY OF THE INVENTION

This object is accomplished in accordance with the invention, in a cable feedthrough of the type described at the outset, in that the cable feedthrough has a mounting unit which can be connected to a wall section of an appliance, that the mounting unit is or can be connected to the cable fixing unit in a form locking manner and that the mounting unit is designed such that it provides an electrically conductive connection between the shield contact element and the wall section.

The advantage of the solution according to the invention is to be seen in the fact that, with it, it is possible to connect the cable fixing unit itself to the mounting unit, wherein the electrical connection between the wall section and the shield contact element is then provided via the mounting unit.

As a result, it is, for example, possible to produce the cable fixing member from suitable, inexpensive materials without having to take the electrical conductivity of these materials into account whereas only the mounting unit has to be produced such that it provides the electrically conductive connection between the wall section and the shield contact element.

An electrically conductive connection within the meaning of this patent application is to be understood as a connection with materials, the electrical conductivity of which has at least the values of the electrical conductivity of aluminum, steel, brass or copper so that the electrically conductive connection required for the cable feedthrough according to the invention also corresponds to that of customary materials, from which shielded housings for electrical systems can be produced.

With respect to the connection between the cable fixing unit and the mounting unit, no further details have so far been given.

One advantageous solution, for example, provides for the cable fixing unit to engage with the holding section in a receptacle of the mounting unit and to be fixed in it in a form locking manner.

Such a connection can be realized in a relatively simple manner and, in addition, allows the cable fixing unit to be designed in accordance with a cable fixing unit which can also be used itself as a cable feedthrough but not with a shield contacting member.

With regard to the connection between the holding section and the receptacle, no further details have so far been given concerning the design of the form locking connection, wherein all designs of form locking connections are, in principle, possible.

One advantageous solution provides for the holding section to be held in the receptacle in a form locking manner by way of threads engaging in one another.

Another advantageous solution provides for the holding section to be held in the receptacle in a form locking manner by way of elements engaging behind one another.

These elements can, for example, be snap-in elements or noses engaging behind a flange.

With respect to the arrangement of the shield contact element, no further details have been given in conjunction with the preceding explanations of the solution according to the invention.

In this respect, the shield contact element could be installed in the wall section as a separate part during the assembly of the cable feedthrough.

One advantageous solution provides for the shield contact element to be held on the mounting unit.

In this respect, the shield contact element is preferably arranged on the mounting unit at an area located outside of the receptacle for the holding section.

In this respect, the shield contact element could, in principle, be held at the end or on the circumference of the mounting unit.

One particularly favorable solution provides for the shield contact element to be inserted into a shield contact element receptacle of the mounting unit and so the mounting unit is easy to handle and mount since the shield contact element is arranged in the interior of the mounting unit.

One expedient solution provides for the shield contact element receptacle to be arranged in an area of the mounting unit located opposite the receptacle for the holding element.

Furthermore, no further details have been given in conjunction with the solution described thus far as to how the mounting unit is intended to be held on the wall section.

One advantageous solution, for example, provides for the mounting unit to be securable to an inner wall surface of an opening of the wall section.

Such a manner of fixing could be realized, for example, by way of a press fit.

Another advantageous solution provides for the mounting unit to be securable to the wall section in a form locking manner.

It is provided, in particular, for the secure mounting of the mounting unit for the mounting unit to pass through an opening in the wall section.

Furthermore, the mounting unit can be fixed to the wall section in an advantageous manner, in particular, when the mounting unit has elements engaging in the inner wall of the opening in a form locking manner.

One advantageous solution provides for the elements engaging in the inner wall in a form locking manner to be thread elements.

In this respect, the thread elements could be thread elements with a conventional machine thread or standard thread.

It is, however, also possible to design the thread elements as conventional thread elements for screwing into metal sheets.

Another advantageous solution provides for the thread elements to be self-cutting thread elements so that with these thread elements either a pre-cut thread in the wall section can be rethreaded or the thread in the wall section can be independently cut.

With respect to the electrically conductive connection between the wall section and the mounting unit, no further details have so far been given.

One particularly favorable solution provides for the mounting unit to be connectable to the wall section in an electrically conductive manner in the region of the opening since, as a result, it is possible to provide the electrically conductive connection with the wall section at the same time as the mounting unit is mounted on this wall section.

For example, this may be realized in that the mounting unit is provided with elements which provide the electrically conductive connection to the wall section and engage in it.

These elements could be elements acting independently of the attachment of the mounting unit to the wall section.

It is, however, also possible to provide as such elements the elements which serve to fix the mounting unit to the wall section.

One particularly favorable possibility provides for the mounting unit to be provided with elements which provide the electrically conductive connection to the wall section and engage in the inner wall of the opening.

Such elements engaging in the inner wall of the opening are, in the simplest case, elements of threads which can be used at the same time to fix the mounting unit to the opening.

One particularly favorable solution provides for the electrically conductive connection between the elements engaging in the inner wall and the inner wall to be improved by elements which provide tensioning during engagement.

Such a reinforced friction may be realized, for example, in that in the case of thread elements these are not designed as conventional standard threads but rather, for example, as conically extending threads which build up an increasing tensioning between the mounting unit and the wall section as a result of reinforced friction the further they are screwed into the opening of the wall section.

An additional advantageous solution provides for the mounting element to have additional elements which dig into the wall section.

Such additional elements which dig into the wall section could be, for example, projections in the region of a collar engaging over the opening.

It is, however, also conceivable to integrate these projections into the elements which engage in the inner wall.

In addition, one advantageous variation of the solution according to the invention provides for the mounting unit to be mountable from the side of the wall section, on which the cable fixing unit is arranged, so that it is possible to connect the mounting unit with the cable fixing unit and then fix the two in place together in the wall section from one side so that accessibility of the wall section on one side is sufficient.

With respect to the design of the cable fixing unit, no further details have been given in conjunction with the preceding explanations concerning the individual solutions according to the invention.

No further details have been given, in particular, with respect to the design of the cable fixing member of the cable fixing unit.

In this respect, it is preferably provided for the cable fixing member to be arranged on the fixing housing outside of the holding section.

It is particularly favorable when the cable fixing member is arranged on the fixing housing on a side located opposite the holding section.

In this respect, the cable fixing member can be designed in the most varied of ways.

In the simplest case, the cable fixing member can comprise a clamping member for the cable.

One particularly expedient solution provides for the cable fixing member to comprise a cap nut and a fin basket, wherein the fin basket can be acted upon by the cap nut in the direction of a cable running through the cable feedthrough and the cable can be clamped by the fin basket.

The fin basket could act directly on the cable. A solution which is particularly advantageous from a constructional point of view provides for the fin basket to surround an annular seal and for an annular seal to be acted upon by the fin basket and, as a result, abut on a cable in order to clamp the cable.

In this case, the fin basket does not act directly on the cable but rather on the annular seal and clamps the cable with the annular seal.

In this respect, the annular seal can, at the same time, develop a sealing effect against moisture.

The sealing effect of the annular seal is ideal, in particular, when the annular seal interacts with a sealing edge extending around the fixing housing so that the annular seal can also bring about a moisture-tight closure in relation to the fixing housing.

The cap nut for acting on the fin basket can be securable to the fixing housing in the most varied of ways.

It would be conceivable, for example, to secure the cap nut relative to the fixing housing in the direction of the central axis by means of a snap-in connection.

One particularly favorable solution provides, however, for the fixing housing to have an external thread, into which an internal thread of the cap nut engages so that the cap nut can be screwed onto the fixing housing and, as a result, be movable in an axial direction relative to the fixing housing.

With respect to the design of the shield contact element, no further details have likewise been given in conjunction with the preceding explanations concerning the individual solutions according to the invention.

One advantageous solution provides, for example, for the shield contact element to have an outer body, proceeding from which individual contact elements extend in the direction of the central axis.

The individual contact elements are preferably fixed in the outer body in that they engage around a holding ring seated in the outer body.

The individual contact elements have, for example, contact fingers which extend in the direction of the central axis.

The contact fingers preferably have such a length that they extend as far as a passage surrounded by them.

With such contact elements, in particular the contact fingers thereof, it is easy to provide the electrical contact to the cable shield, namely as a result of the fact that a plurality of contact fingers make contact with the cable shield, wherein the contact fingers themselves are again connected to the mounting unit in an electrically conductive manner via the outer body.

Alternatively thereto, it is provided for the shield contact element to have contact brackets which extend in the direction of the central axis.

The contact brackets are preferably held on an outer body which is inserted into the shield contact element receptacle with radial tension.

One particularly favorable solution provides for the contact brackets to be integrally formed on the outer body in one piece and to extend radially and elastically inwards in the direction of the central axis proceeding from the outer body.

Furthermore, it is preferably provided for the contact brackets to have a bracket runner for making contact with the cable shield and this prevents the contact brackets from becoming caught on the exposed cable shield section.

Additional features and advantages of the invention are the subject matter of the following description as well as the drawings illustrating several embodiments.

DETAILED DESCRIPTION OF THE INVENTION

A first embodiment of a cable feedthrough 10 according to the invention, illustrated in FIGS. 1 and 2, comprises a cable fixing unit designated as a whole as 12 as well as a mounting unit designated as a whole as 14 which, as will be described in detail in the following, can be connected to one another in a form locking manner.

Figure 2:
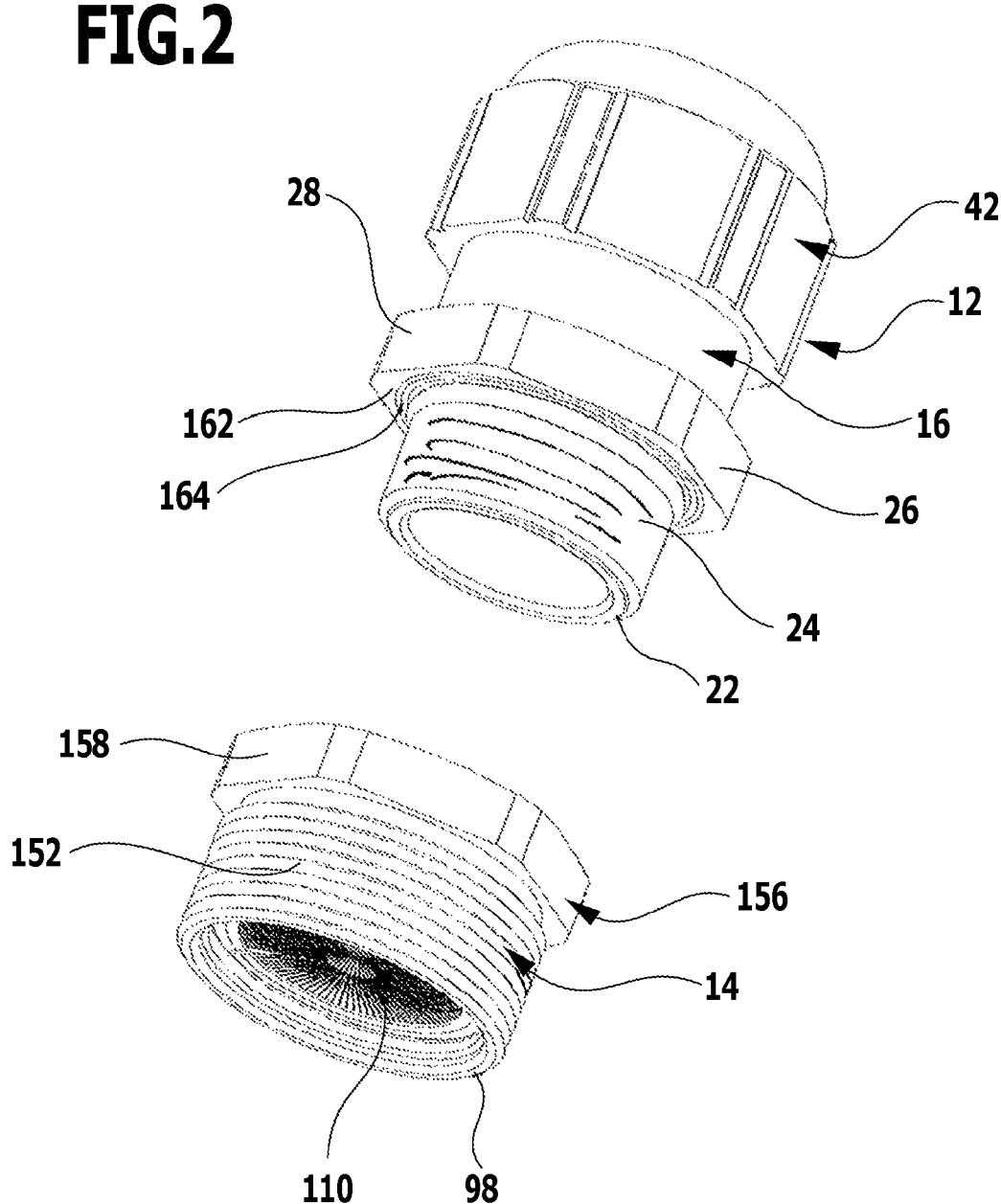
FIG. 2 shows a perspective illustration of the first embodiment of the cable feedthrough according to the invention with illustration of the cable fixing unit and the mounting unit in the state separated from one another.
Figure 3:
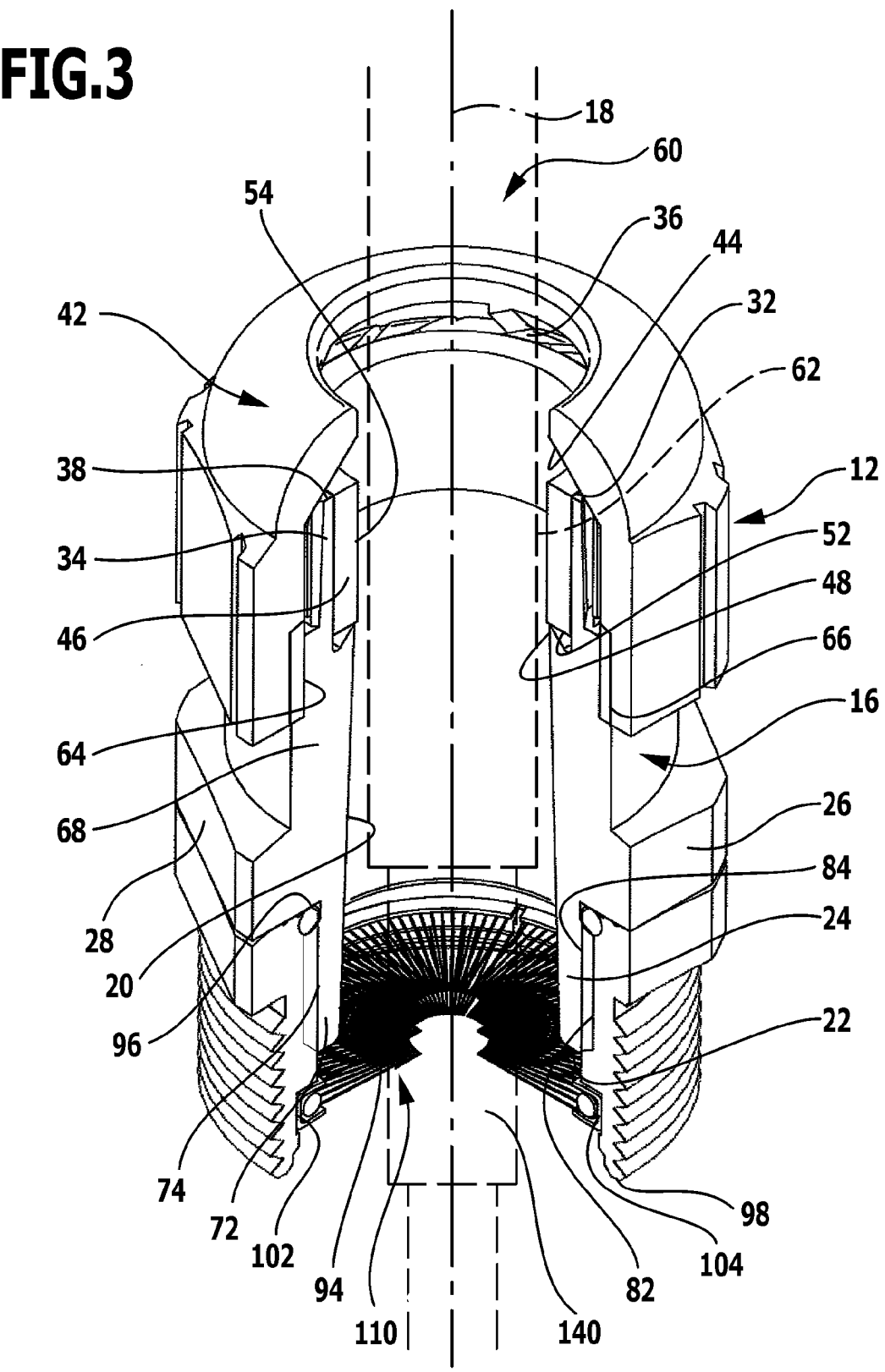
FIG. 3 shows a partially cutaway illustration of the first embodiment of the cable feedthrough according to the invention, with which the cable fixing unit and the mounting unit are already connected to one another.

In this respect, the cable fixing unit 12, as illustrated in FIGS. 2 and 3, comprises a fixing housing 16 which is designed, for example, in the form of a housing connector and is provided in the region of a first end 22 with a holding section 24 which, for example, joins directly onto the first end 22.

The fixing housing 16 extends like a tube and coaxially to a central axis 18 and likewise has a central passage 20 which extends coaxially to the central axis 18 and by means of which a cable can be guided through the cable fixing unit 12 and, in particular, the fixing housing 16 thereof.

In addition, a tool engagement collar 26 which comprises tool engagement surfaces 88, for example in the form of flat surfaces, is provided on a side of the holding section 24 facing away from the first end 22.

The entire fixing housing 16 may be turned by means of a tool via the tool engagement collar 26.

Furthermore, the cable fixing unit 12, as illustrated in FIG. 3, comprises at a second end 32 of the fixing housing 16 located opposite the first end 22 a fin basket 34 which comprises individual fins 36 which are arranged around a central axis 18 of the fixing housing and can be acted upon in the region of their fin ends 38 by a cap nut which is designated as a whole as 42, wherein the cap nut 42 has a pressure surface 44 which extends conically to the central axis 18 and with which the fin ends 38 can be acted upon in such a manner that they can be moved towards the central axis 18 in a radial direction relative thereto.

The fins 36 of the fin basket 34 enclose an annular seal 46 which extends from the fin ends 38 in the direction of the first end 22 of the fixing housing 16 as far as a sealing edge 48 which is provided on the fixing housing 16 so as to extend like a ring around the central axis 18 and on which the annular seal 46 abuts with an end face 52 such that the sealing edge 48 digs into the end face 52 and, therefore, can be closed in a sealed manner with it.

As a result, the annular seal 46 can be acted upon by the individual fins 36 of the fin basket 34 in the direction of the central axis 18 so that the annular seal 46 can abut with an inner surface 54 on a cable 60, in particular an outer casing surface 62 of the cable 60, in order to provide a sealed connection with the outer casing surface 62 when the cable 60 engages in the central passage 20 of the fixing housing 16.

In the embodiment according to the invention, the fin basket 34 with the fins 36 can be integrally formed on the fixing housing 16 in one piece when the fixing housing 16 consists of plastic.

When the fixing housing 16 is formed from a non-elastic material, the fin basket 34 with the fins 36 can be inserted into the fixing housing 16 as an insertion part and fixed to it.

For the purpose of fixing it to the fixing housing 16, the cap nut 42 has an internal thread 64 which engages in an external thread 66 of the fixing housing 16, wherein the external thread 66 on the fixing housing 16 is arranged between the tool engagement collar 26 and the fin basket 34 and is arranged circumferentially on a tubular section 68 of the fixing housing 16 which extends between the tool engagement collar 26 and the fin basket 34.

By screwing the cap nut 42 onto the fixing housing 16 with the internal thread 64 engaging in the external thread 66 of the fixing housing 16, the pressure surface 44 of the cap nut 42 can be moved axially and parallel to the central axis 18 and, therefore, the fins 36 can be acted upon at their fin ends 38 by the pressure surface 44 in order to be able to move the annular seal 46 in the direction of the central axis 18 and abut it against the outer casing surface 62 of the cable 60.

The fin basket 34, the annular seal 46 and the cap nut 42 form a cable fixing member 50 together with the section of the fixing housing 16 located opposite the holding section and bearing these elements.

In the first embodiment, the cable fixing unit 12 has as holding section 24 an attachment 72 which extends from the tool engagement collar 26, is of a tubular design and provided with an external thread 74.

The cable fixing unit 12 described can, for example, be designed as a cable gland which is available to purchase as a standard product, wherein in the case of the conventional cable gland the attachment 72 of the fixing housing 16 which is provided with the external thread 74 can be screwed into a threaded bore of a wall, in particular a wall of a housing, in order to fix the cable gland to the housing. In this case, the cable gland serves the purpose of fixing the cable 60 mechanically relative to the housing and, in addition, of obtaining as good a seal as possible between the cable and the housing.

With the solution according to the invention in accordance with the first embodiment, the attachment 72 does not engage in an internal thread of a wall of a housing with the external thread 74 but rather in a receptacle 82 of the mounting unit 14 which is provided with an internal thread 84 and so the external thread 74 can be screwed into the internal thread 84 and thus the entire cable fixing unit 12 can be fixed in a form locking manner relative to the mounting unit 14.

The receptacle of the mounting unit 14 is preferably formed by a sleeve member 92 which extends around a central passage 94, namely from a first end 96 facing the cable fixing unit 12 as far as a second end 98 facing away from the cable fixing unit 12.

In this respect, the receptacle 82 extends in the sleeve member 92 from the first end 96 in the direction of the central axis 18 over at least one third of the central passage 94 of the sleeve member 92.

Furthermore, the sleeve member 92 is provided, proceeding from the second end 98, with a shield contact element receptacle 102 which is designed, for example, as a stepped recess 104 which extends from the second end 98 in the direction of the first end 96, wherein a shield contact element designated as a whole as 110 can be inserted into this receptacle 102.

Figure 4:
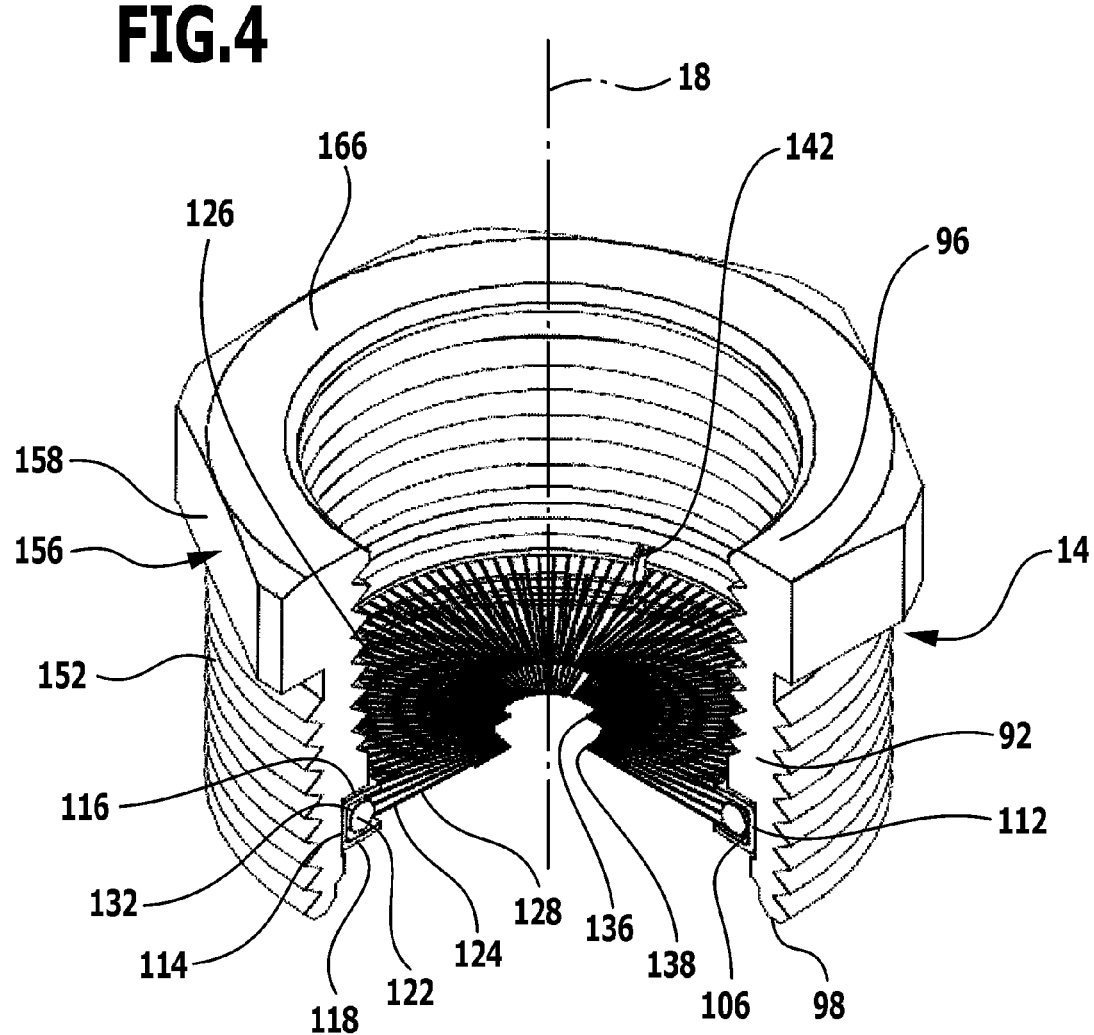
FIG. 4 shows an enlarged, partially cutaway illustration of the mounting unit of the first embodiment.

As illustrated on an enlarged scale in FIG. 4, the shield contact element 110 comprises, for its part, an outer body 112 which is of a V-shaped design in cross section, wherein the outer body 112 has a central arm 114 as well as two side arms 116 and 118, wherein the central arm 114 is aligned approximately parallel to the central axis 18 whereas the side arms 116 and 118 extend transversely to the central axis 118.

The outer body 112 engages around a holding ring 122 which is arranged between the side arms 116 and 118 and is surrounded on its sides facing the side arms 116 and 118 as well as the central arm 114 by individual contact elements 124 which comprise contact fingers 126 and 128, wherein the contact fingers 126 and 128 are connected to one another by a connecting bracket 132 which extends around the holding ring 122 on its sides facing the side arms 116 and 118 as well as the central arm 114.

In the simplest case, the connecting bracket 132 and the contact fingers 126 and 128 are connected to one another in one piece and are bent, for example, from a piece of wire or a piece of flat material.

The contact fingers 126 and 128 preferably each extend as far as central openings 136 and 138 which extend around the central axis 18, wherein the diameter of the openings 136 and 138 is selected such that an exposed cable shield section 140 of the cable 60, which results due to the fact that the outer casing 62 is removed from the cable 60 as far as the cable shield section 140, cannot be pushed through the shield contact element 110 without deformation of the contact fingers 126, 128.

The shield contact element 110 is preferably fixed in place in the receptacle 102 in that the shield contact element 110 does not extend completely around the central axis 18 in the region of its outer body 112 and the holding ring 122 but rather has an interruption 142 and, therefore, is designed to be flexible radially to the central axis 18 so that the shield contact element 110 can be compressed radially and, as a result, can be pushed into the receptacle 102 from the second end 98 for such a time until it can be fixed in place by catching in the radially widened groove 106 of the recess 104.

Figure 5:
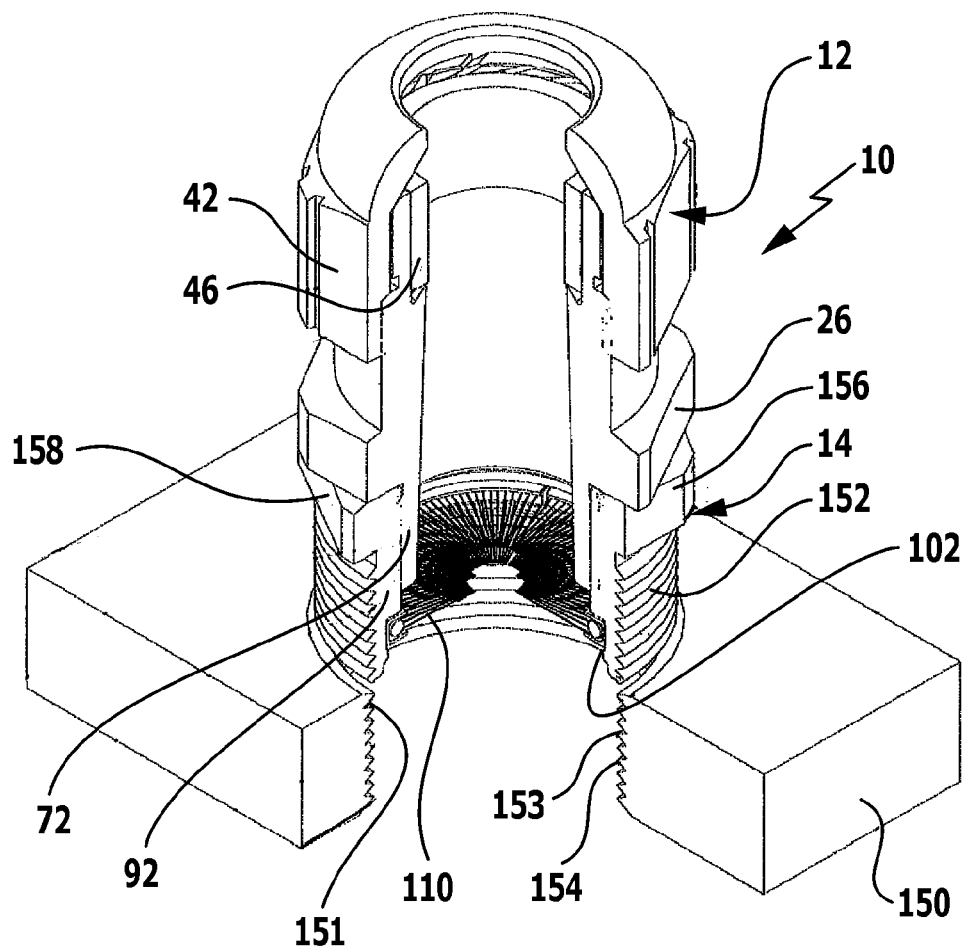
FIG. 5 shows a perspective, partially cutaway illustration of an alignment of the first embodiment of the cable feedthrough according to the invention prior to the mounting thereof in a wall section.

As illustrated in FIGS. 4 and 5, the sleeve member 92 has, proceeding from the second end 98, an external thread 152, with which the sleeve member 92 of the mounting unit 14 can be screwed into an opening 151 of a wall section 150, the inner wall 153 of which has an internal thread 154, onto which the cable feedthrough 10 according to the invention is intended to be mounted.

The wall section 150 is normally part of a housing wall of an electrical appliance or an electrical switching unit or a similar electrical unit which is electrically conductive and so an electrical connection can be provided between the wall section 150 and the mounting unit 14 by screwing the external thread 152 of the mounting unit 14 into the internal thread 154 of the wall section 150.

If the sleeve member 92 is produced from an electrically conductive material, for example metal, the sleeve member 92 can provide an electrically conductive connection between the wall section 150 and the shield contact element 110, which is seated, for its part, in the receptacle 102 of the sleeve member 92 and, therefore, likewise forms an electrically conductive connection to the sleeve member 92 in a simple manner, by screwing it with the external thread 152 into the internal thread 154 of the wall section 150.

Altogether, an electrically conductive connection is provided in a simple manner between the wall section 150 with the internal thread 154 as well as the sleeve member 92 with the outer body 152 and the shield contact element 110 in the receptacle 102 of the sleeve member 92 and so when the shield contact element 110 makes contact with the cable shield 140 of the cable 60, in particular with the contact fingers 126 and 128 thereof, an electrically conductive connection exists between the cable shield 140 and the wall section 150.

This good electrically conductive connection between the wall section 150 and the cable shield 140 can be provided solely by way of the mounting unit 14 and so the cable fixing unit 12 is completely irrelevant with respect to its own, electrical conductivity for the question of the good electrically conductive connection between the cable shield 140 and the wall section 150.

For this reason, a cable fixing unit 12 can, for example, be used which is produced completely from plastic and is, therefore, considerably more inexpensive than a corresponding cable fixing unit consisting of metal would be.

Nevertheless, it is also possible to use a cable fixing unit 12 consisting of metal insofar as this is desirable for reasons of stability or other reasons.

In this case, as well, the cable fixing unit 12 consisting of metal is connected to the mounting unit 14 in an electrically conductive manner in that the external thread 74 of the attachment 72 is screwed into the internal thread 84 of the receptacle 82.

In order to be able to screw the mounting element 14 into the wall section 150, in particular into the internal thread 154 thereof, independently of the cable fixing unit 12, the mounting element 14 is also provided in the region of its first end 96 with a tool engagement collar 156 which adjoins the first end 96 and likewise comprises, for its part, tool engagement surfaces 158 which are designed, for example, as flat surfaces.

In order, in addition, to bring about a good seal between the cable fixing unit 12 and the mounting unit 14, the cable fixing unit 12 has at its end side 162 facing the tool engagement collar 156 a sealing element 164 which can be pressed in a sealingly closed manner against an end side 166 of the tool engagement collar 156 so that a transition can be realized between the mounting unit 14 and the cable fixing unit 12 in the region of the respective tool engagement collar 26 and 156 which is closed sealingly, preferably against moisture.

Figure 1:
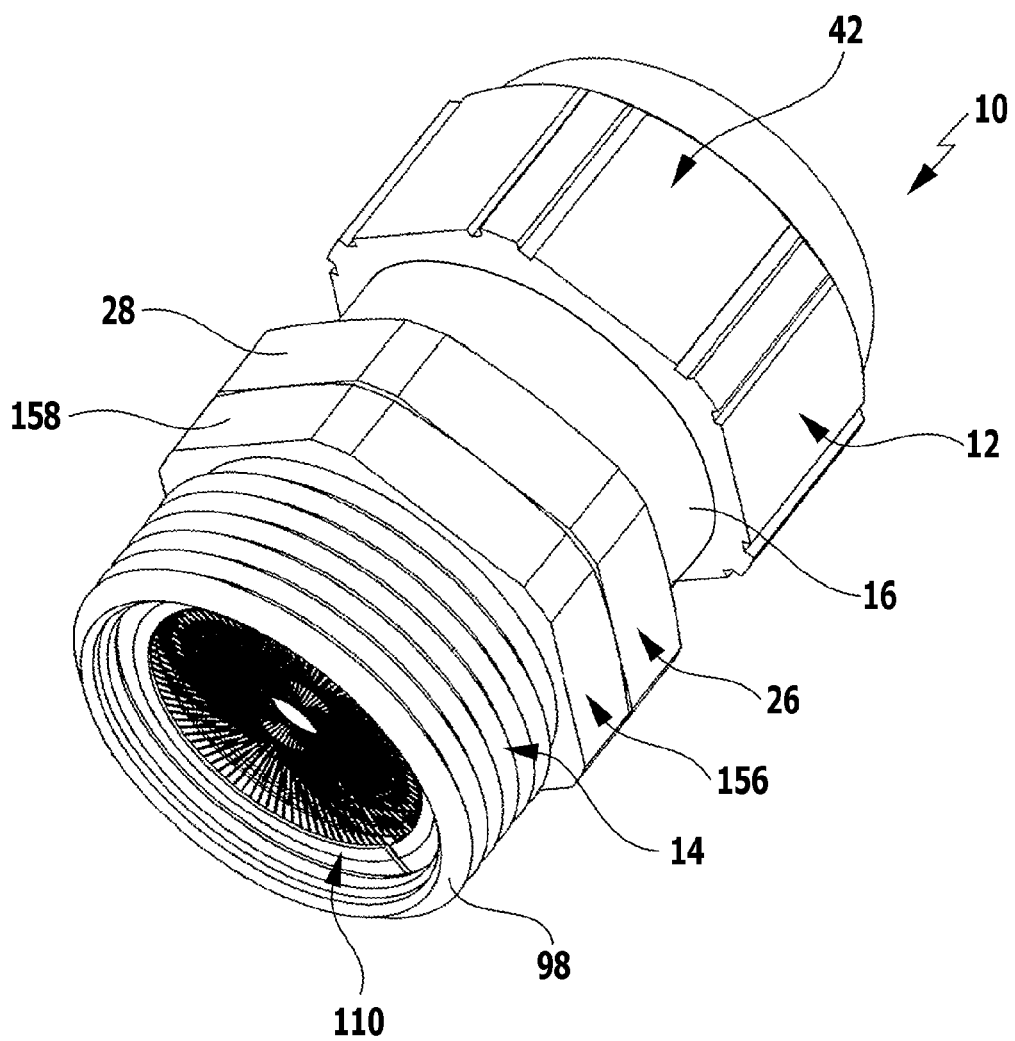
FIG. 1 shows a perspective illustration of a first embodiment of a cable feedthrough according to the invention.

One particularly preferred embodiment provides for the attachment 72 with the external thread 74 to be screwed into the internal thread 84 of the receptacle 82 to such an extent that, finally, the tool engagement surfaces 28 of the tool engagement collar 26 are in alignment with the tool engagement surfaces 158 of the tool engagement collar 156 of the mounting unit 14, as illustrated in FIG. 1.

Figure 6:
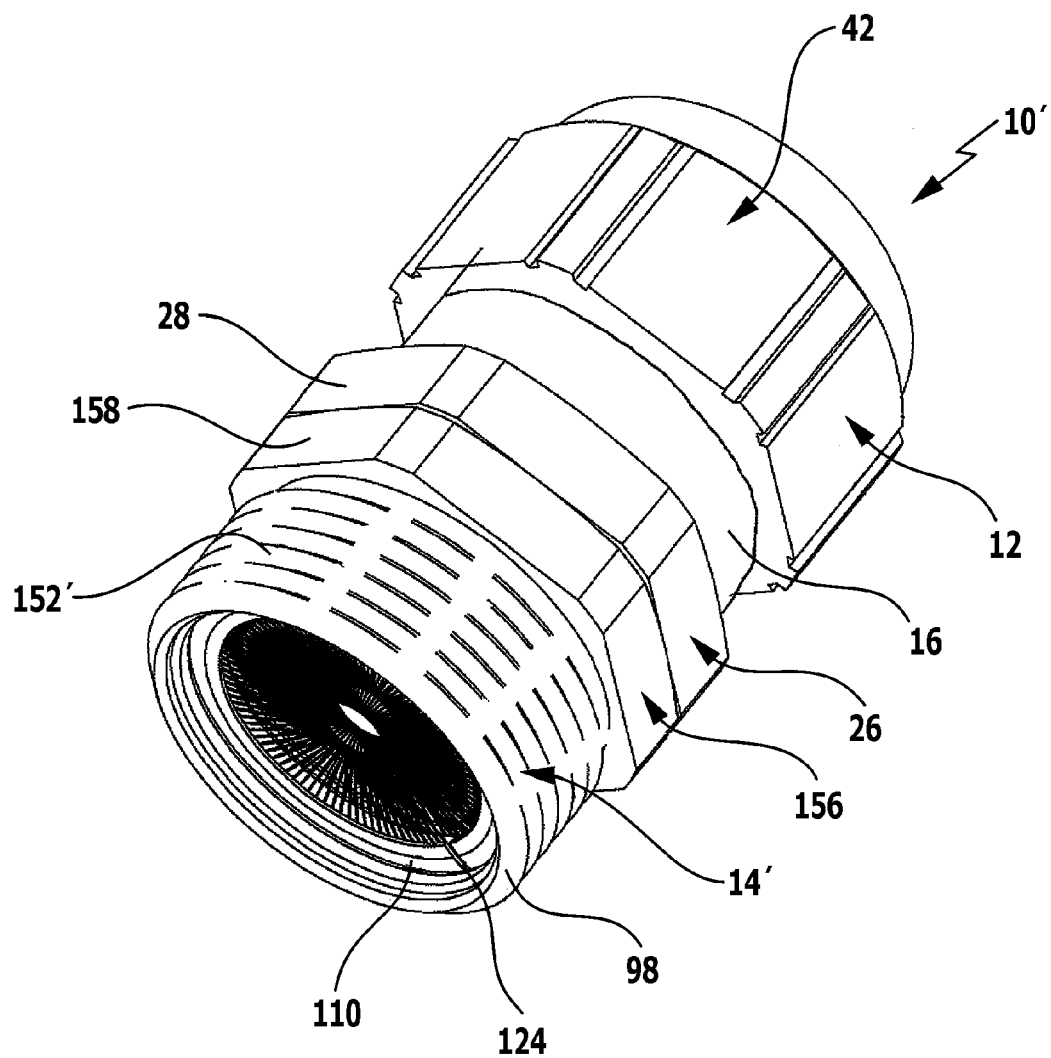
FIG. 6 shows a perspective illustration of a second embodiment of a cable feedthrough according to the invention.

In a second embodiment of a cable feedthrough 10' according to the invention, illustrated in FIG. 6, those parts which are identical to those of the first embodiment are given the same reference numerals and so reference can also be made in full to the comments on the first embodiment.

In contrast to the first embodiment, the mounting unit 14' does not comprise a convention external thread 152 on the outer side of the sleeve member but rather an external thread 152' which is designed as a self-cutting thread and so this self-cutting thread 152' can be screwed in a self-cutting manner into bores of a wall area 150 designed from a suitable material or into bores in a sheet metal material, wherein, in this case, the self-cutting thread 152' is a thread which cuts metal independently.

Figure 7:
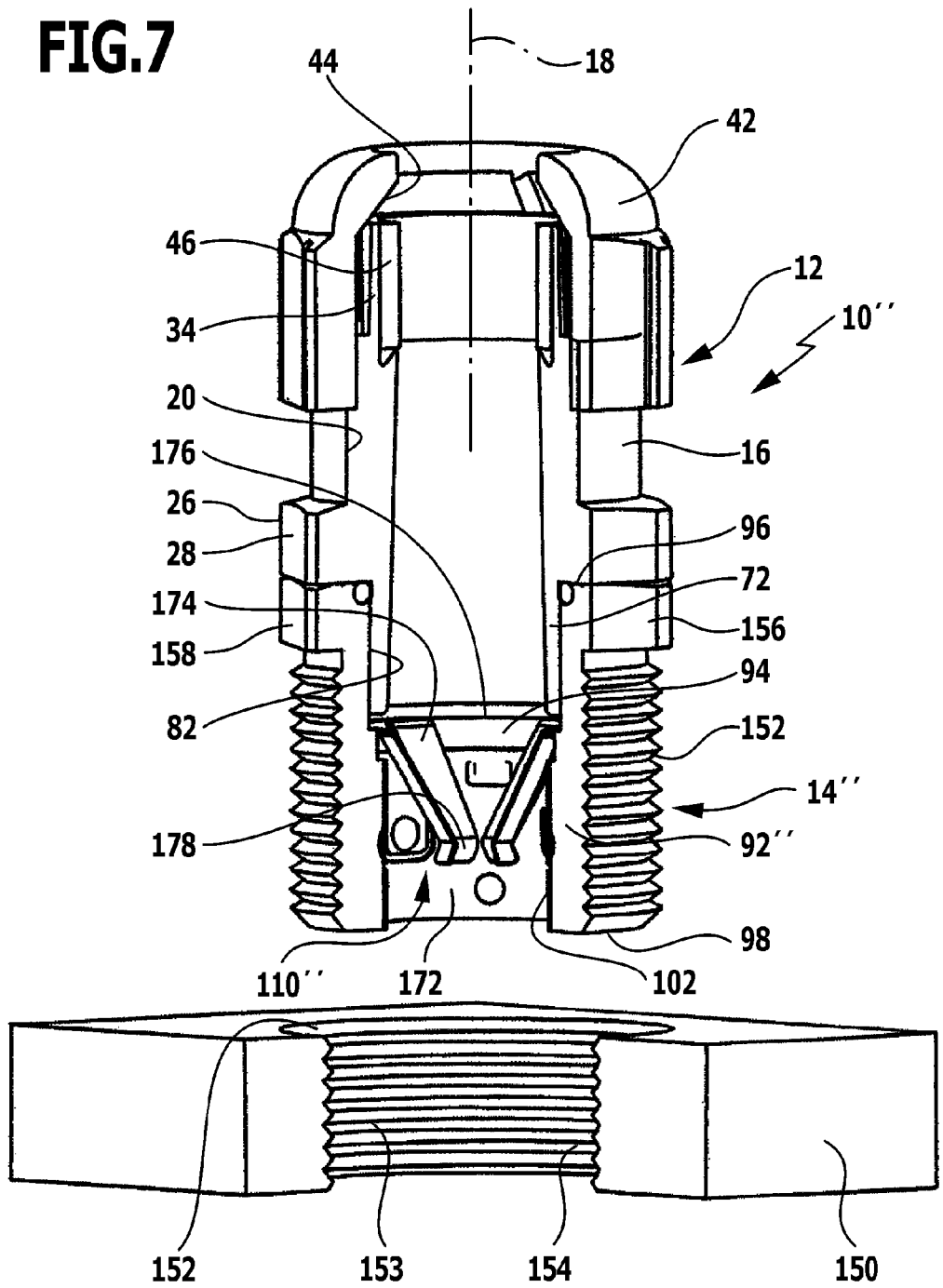
FIG. 7 shows a partially cutaway illustration of a third embodiment of a cable feedthrough according to the invention prior to mounting in a wall section.

In a third embodiment of a cable feedthrough 10" according to the invention, illustrated in FIG. 7, the cable fixing unit 12 is designed in the same way as in the first two embodiments and so reference can be made in full to the comments in conjunction with these embodiments.

In contrast to the preceding embodiments, the mounting unit 14" is, however, of a different design.

This does comprise the sleeve member 92" with the external thread 152 but a shield contact element 110" is inserted into the sleeve member 92" from the second end 98 and this comprises, in contrast to the shield contact element 110, an outer body 172 which lies flat in the shield contact element receptacle 102, extends into the shield contact element receptacle 102 from the second end 98 of the sleeve member 92 and has contact brackets 174 which are bent inwards proceeding from the outer body 172, extend in the direction of the central axis 18 and, in addition, in the direction of the second end 98 of the sleeve member 92 proceeding from an inner end 176 of the outer body 172, which faces the receptacle 82 for the attachment 72, and thereby project radially inwards in the direction of the central axis 18 proceeding from the outer body 172.

In this respect, the contact brackets 174 have at their ends a bracket runner 178 which is again bent radially outwards and prevents the contact brackets 174 from becoming caught in the exposed cable shield section 140.

A cable 60 pushed through the central passage 20 of the cable fixing unit 12 and the central opening 94 of the sleeve member 92' will then make contact with the contact brackets 174 by means of an exposed cable shield section 140, these contact brackets, on the other hand, also being in electrically conductive connection with the sleeve member 92 due to the fact that the outer body 172 of the shield contact element 110" abuts on the sleeve member 92 with a tension acting radially outwards and so, altogether, the sleeve member 92 is in a position to provide a good, electrically conductive connection between the wall section 150 and the contact bracket 174, in particular with the cable shield section 140 which is in contact with it.

Figure 8:
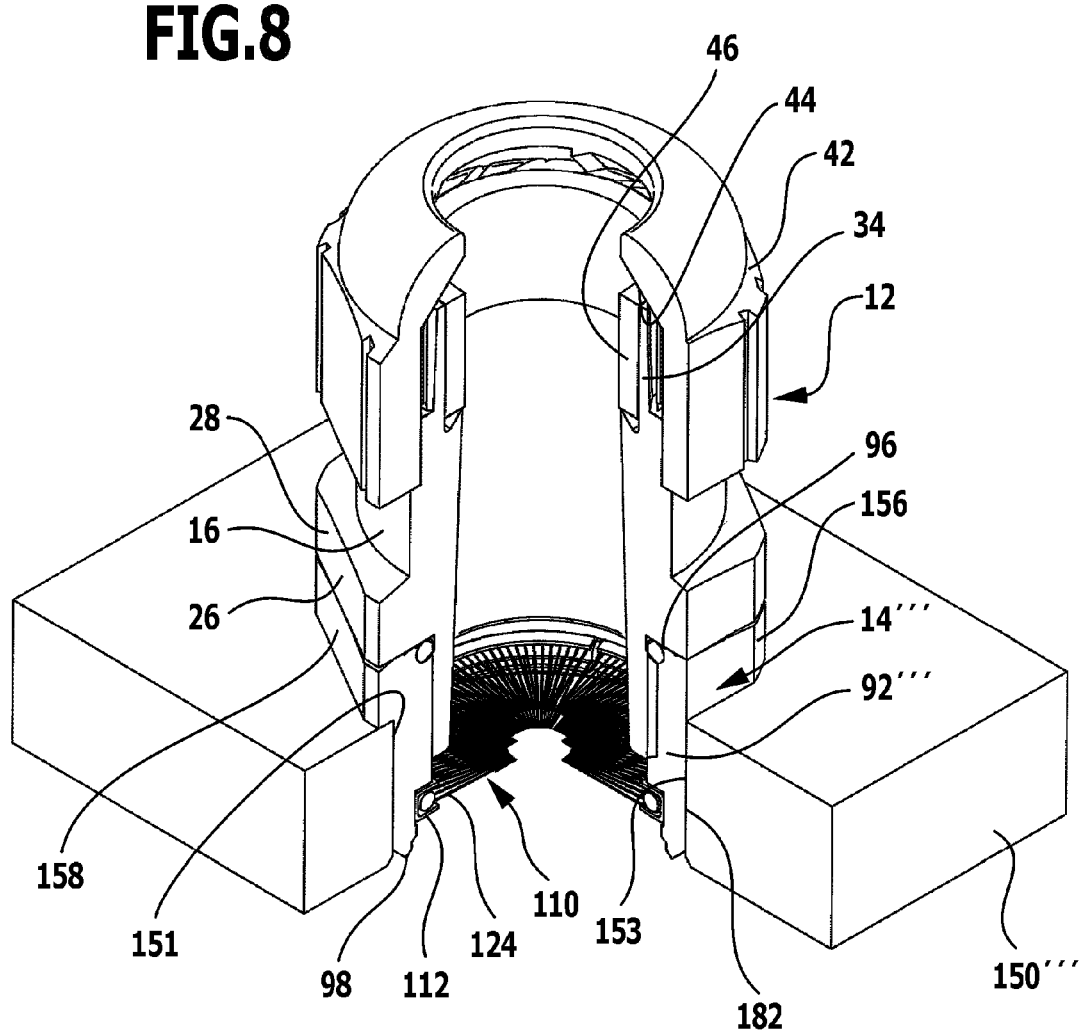
FIG. 8 shows a partially cutaway illustration, mounted in a wall section, of a fourth embodiment of a cable feedthrough according to the invention.

In a fourth embodiment, illustrated in FIG. 8, the cable fixing unit 12 is designed in the same way as in the preceding embodiments, as explained in conjunction with the preceding embodiments.

In contrast to the preceding embodiments, the mounting unit 14''' is, however, of a different design insofar as the sleeve member 92''' no longer bears the external thread 152, which engages in the internal thread 154 of the wall section 150''', on its outer side but rather has a smooth outer side 182 which is seated in the inner wall 153 of the opening 151 of the wall section 150''' by pressing it in and so the mounting unit 114''' is anchored in the wall section 150''' merely as a result of pressure and, therefore, in a force locking manner.

With respect to the remaining features, not only of the cable fixing unit 12 but also of the mounting unit 14, reference is made in full to the preceding embodiments.

Figure 9:
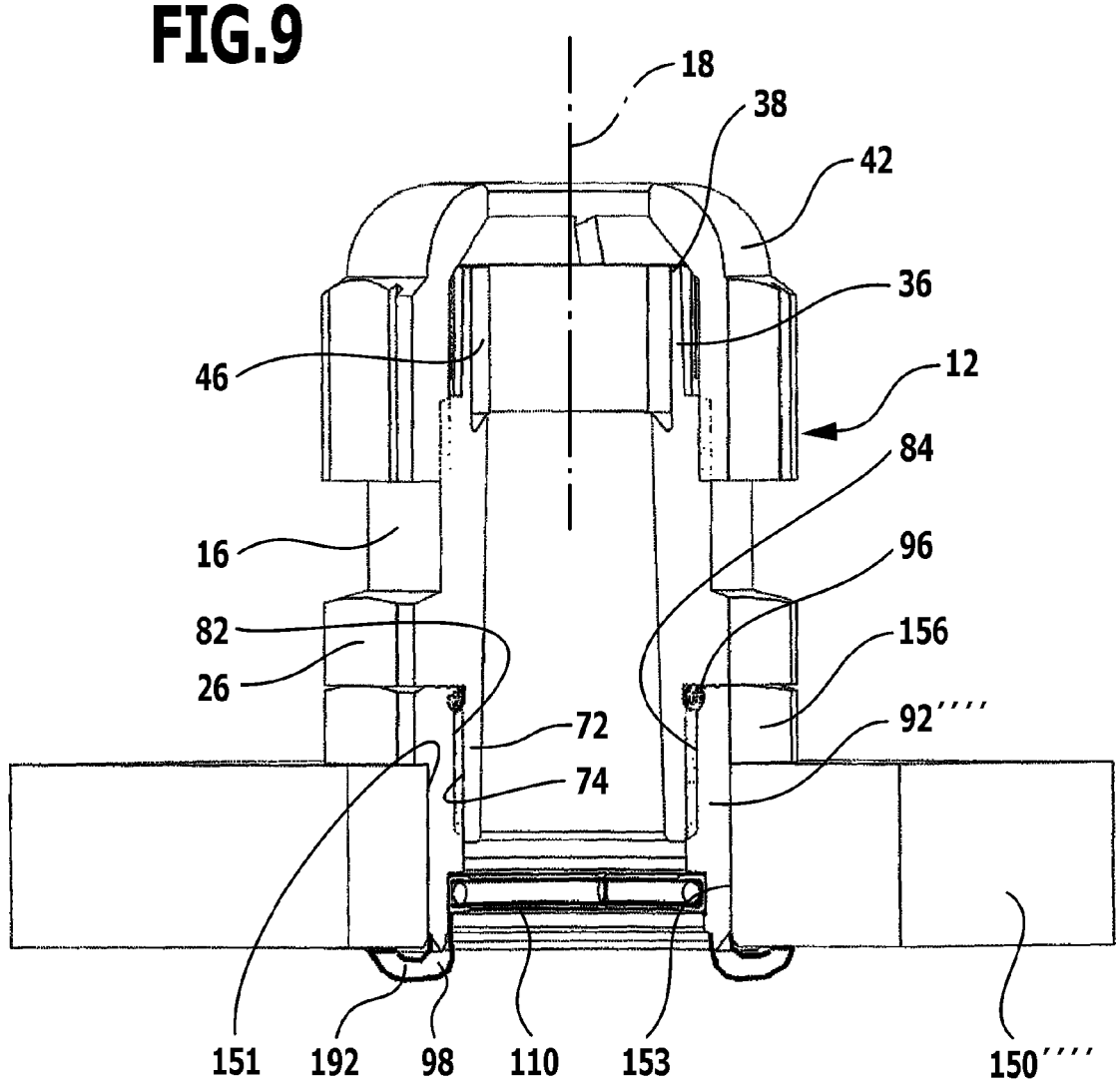
FIG. 9 shows a partially cutaway illustration, mounted in a wall section, of a fifth embodiment of the cable feedthrough according to the invention.
Figure 10:
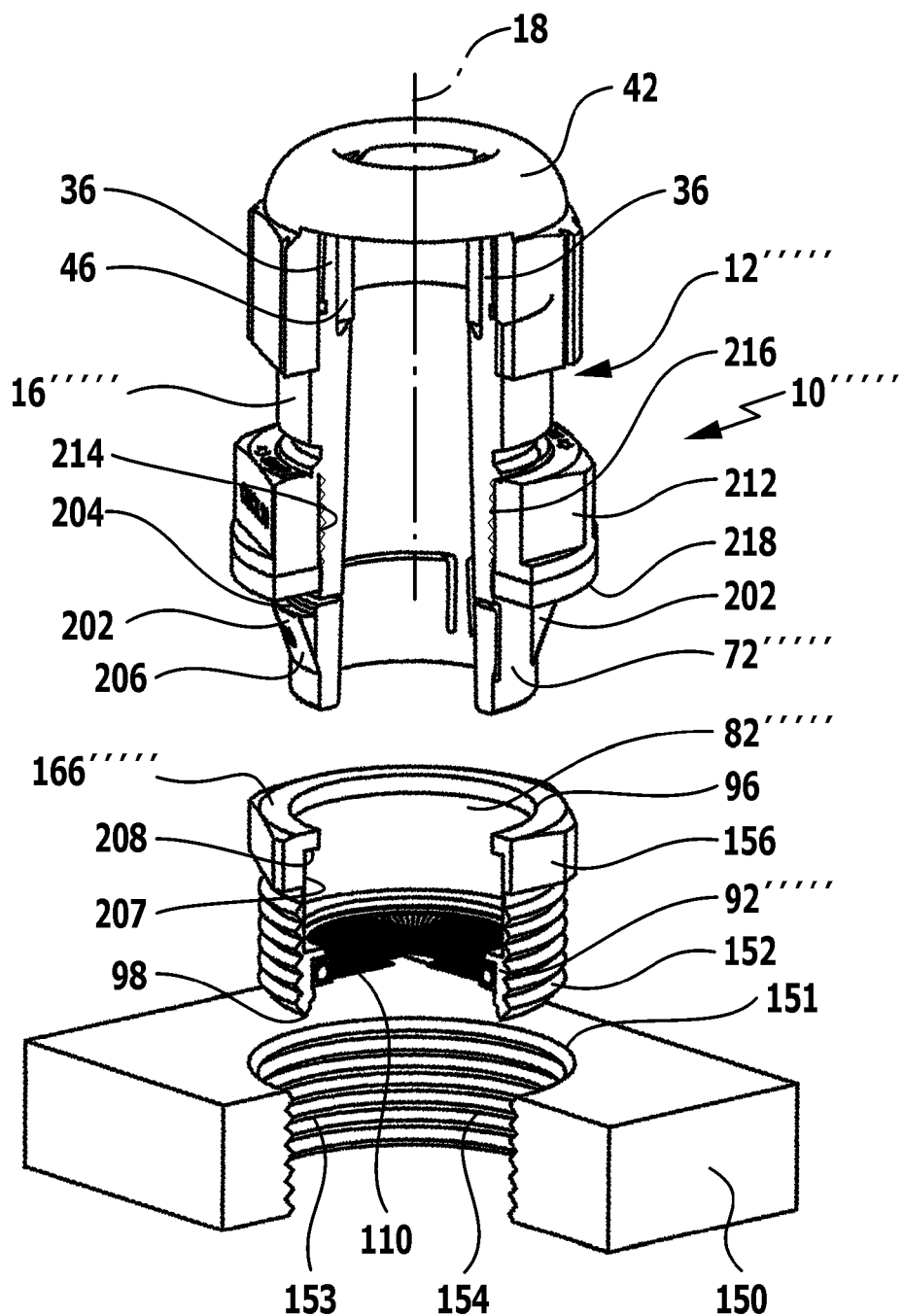
FIG. 10 shows a partially cutaway illustration of a sixth embodiment of a cable feedthrough according to the invention with a cable fixing unit separated from the mounting unit prior to mounting thereof in a wall section.

In a fifth embodiment, illustrated in FIG. 9, the cable fixing unit 12 is likewise designed in the same way as that described in all the preceding embodiments.

Furthermore, the wall section 150'''' is likewise provided with a smooth inner wall 153, in which the sleeve member 92'''' is seated.

However, the sleeve member 92'''' is provided in the region of its second end 98 with a beading 192, by means of which the sleeve member is anchored to the wall section 150'''', wherein the wall section 150'''' is secured in a form locking manner between the beading 192 and the tool engagement collar 156.

With respect to all the remaining features, reference can be made in full to the comments on the preceding embodiments.

In a sixth embodiment of a cable feedthrough 10''''' according to the invention, the fixing housing 16''''' is of a different design insofar as the attachment 72''''' has no external thread but rather snap-in elements 202 which can be moved radially to the central axis relative to the attachment 72''''' so that the snap-in elements 202 can be moved with their snap-in surfaces 204 radially inwards towards the central axis 18 but move independently outwards into their snap-in position radially to the central axis 18.

Furthermore, the snap-in elements 202 have contact surfaces 206 which extend outwards conically with respect to the central axis 18 proceeding from an external diameter of the attachment 72''''' as far as the snap-in surfaces 204.

Figure 11:
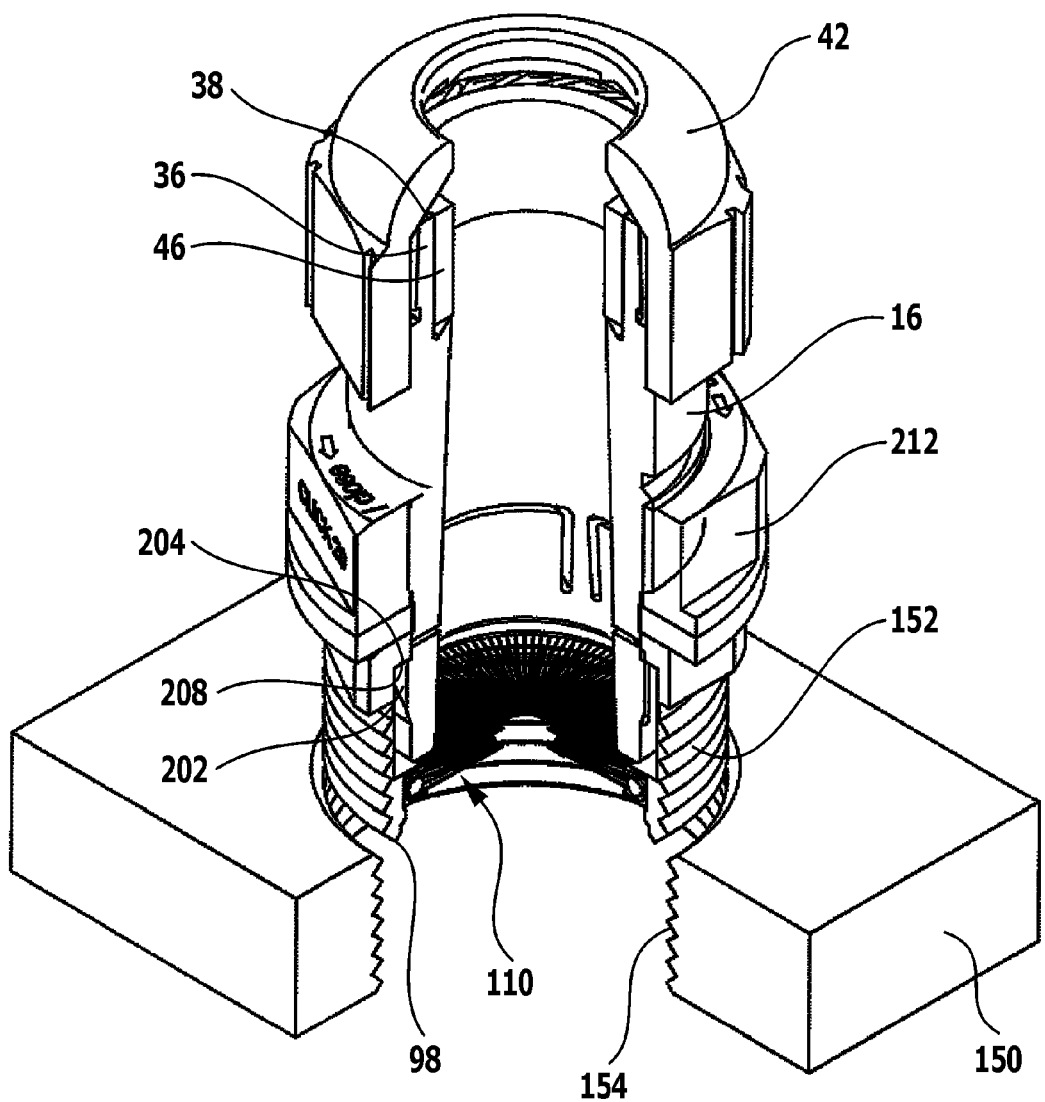
FIG. 11 shows an illustration of the sixth embodiment according to FIG. 10, wherein the cable fixing unit and the mounting unit are connected to one another prior to mounting in the wall section
Figure 12:
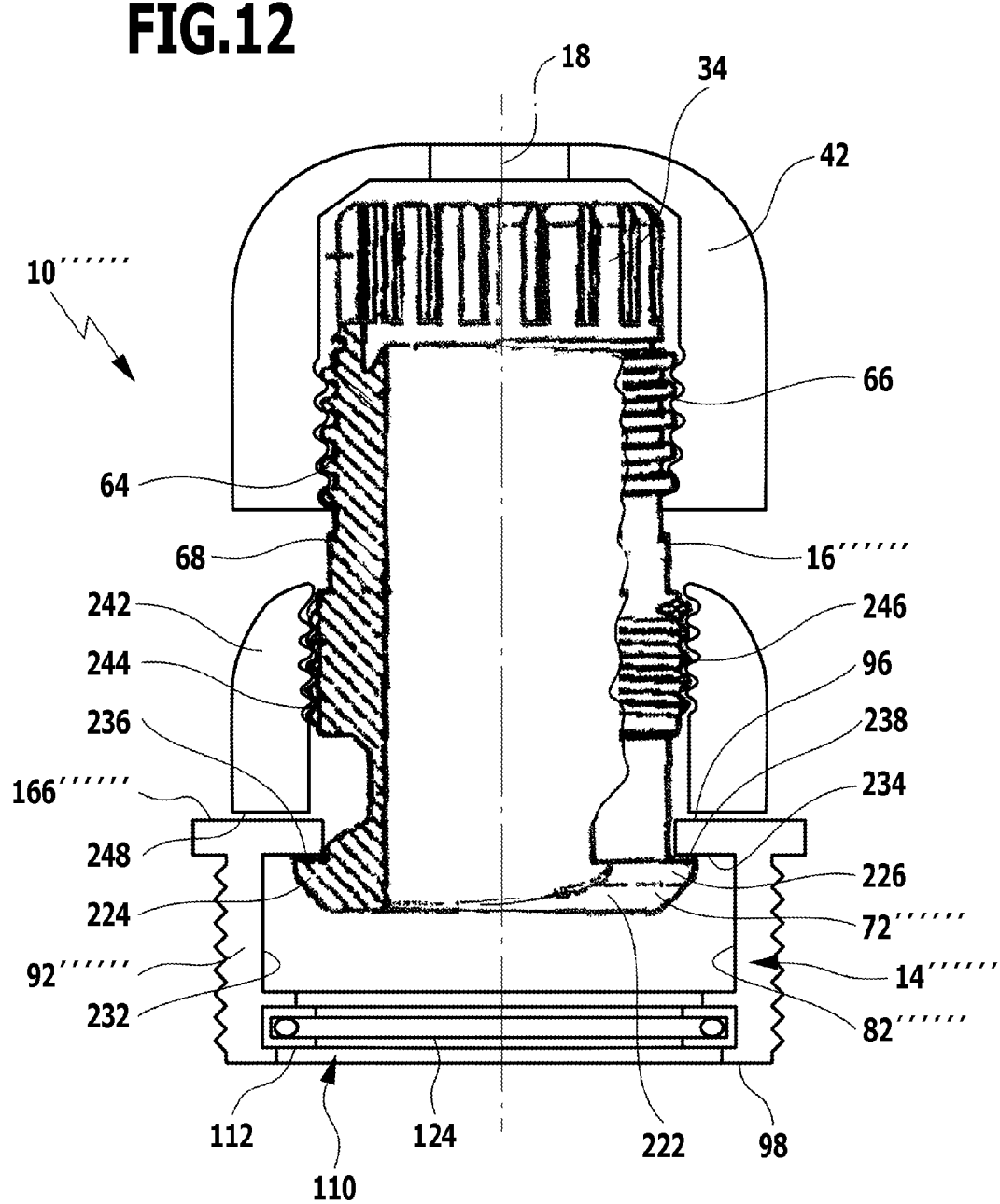
FIG. 12 shows a partially cutaway illustration of a seventh embodiment of a cable feedthrough according to the invention.

The attachment 72''''' with the snap-in elements 202 can be pressed into the receptacle 82''''' of the sleeve member 92''''', namely to such an extent until the snap-in surfaces 204 engage behind an indentation 208 provided in the receptacle 82''''' by a circumferential recess 207, as illustrated in FIG. 11.

As a result, the attachment 72''''' is secured in the receptacle 82''''' against any movement out of the receptacle 82''''' in a direction parallel to the central axis 18.

Furthermore, it is not the tool engagement collar 26 which is provided on the fixing housing 16 but rather a pressure ring 212 which engages in an external thread 216 of the fixing housing 16''''' with an internal thread 214 so that the pressure ring 212 can be adjusted by rotating it in the direction of the central axis 18, wherein rotation of the pressure ring 212 is possible in such a manner that the pressure ring 212 abuts with its pressure side 218 on the end face 166''''' of the sleeve member 92''''' and is, therefore, in a position to displace the entire fixing member 16 relative to the sleeve member 92''''' in such a manner that the snap-in surfaces 204 come to rest on the indentations 208 and so the cable fixing unit 12 can be fixed in place relative to the mounting unit 14, in particular relative to the sleeve member 92'''''', by tightening the pressure ring 212.

As for the rest, those elements which are identical to those of the preceding embodiments are given the same reference numerals and so reference can be made in full to the comments on these elements in conjunction with the preceding embodiments.

In a seventh embodiment of a cable feedthrough 10'''''' according to the invention, the fixing housing 16'''''' is of a different design insofar as the attachment 72'''''' has no external thread and no snap-in elements but rather is designed as a holding head 222 which has holding noses 224 and 226, for example, which are located on opposite sides and arranged in the receptacle 82'''''' together with the holding head 222 and, in this respect, engage in a recess 232 which extends radially around the circumference and forms on a side facing the first end 96 a flange surface 234, on which the noses 224 and 226 abut with their supporting surfaces 236 and 238 in order to supportingly fix the fixing housing 16'''''' in place relative to the mounting unit 14'''''', in particular relative to the sleeve member 92''''''.

In order to keep the supporting surfaces 236 and 238 in abutment on the flange surface 234, the fixing housing 16'''''' is provided in the same way as in the sixth embodiment with a pressure ring 242 which engages with an internal thread 244 in an external thread 246 of the fixing housing 16'''''' and can be adjusted in the direction of the central axis 18 by turning it relative to the fixing housing 16'''''' so that the pressure ring 242 abuts with a pressure side 248 on the end face 166'''''' of the sleeve member 92'''''' and is supported and therefore in a position to act on the entire fixing housing 16 such that the noses 224 and 226 abut with the supporting surfaces 236 and 238 on the flange surface 234 acted upon by a force and, therefore, are fixed altogether in a form locking manner relative to the sleeve member 92''''''.

As for the rest, those elements which are identical to those of the preceding embodiments are given the same reference numerals and so reference can be made in full to the comments on these elements in conjunction with the preceding embodiments.

The fixing housing 16'''''' has, in particular, in the same way as in the embodiments described above, a cable fixing member 50 with a fin basket 34, an annular seal 46 seated in the fin basket 34 and a cap nut 42 which serve to fix the cable in position, in the same way as that described in conjunction with the preceding embodiments.

The shield contact element 110 is also designed in the same way as that described in any one of the preceding embodiments and so reference can be made thereto in full.

The invention claimed is:

1. Cable feedthrough comprising a cable fixing unit with a fixing housing provided with a cable fixing member and a holding section as well as a shield contact element making contact with a cable shield of a cable guided through the cable feedthrough, the cable feedthrough having a mounting unit connectable to a wall section of an appliance, the mounting unit is connectable or connected to the cable fixing unit in a form locking manner and the mounting unit being designed such that it provides an electrically conductive connection between the shield contact element and the wall section; and
   wherein the cable fixing unit engages with the holding section in a receptacle of the mounting unit and is fixed in it in a form locking manner.

2. Cable feedthrough as defined in claim 1, wherein the holding section is held in the receptacle in a form locking manner by way of threads engaging in one another.

3. Cable feedthrough as defined in claim 1, wherein the holding section is held in the receptacle in a form locking manner by way of elements engaging behind one another.

4. Cable feedthrough as defined in claim 1, wherein the shield contact element is held on the mounting unit.

5. Cable feedthrough as defined in claim 4, wherein the shield contact element is inserted into a shield contact element receptacle of the mounting unit.

6. Cable feedthrough as defined in claim 5, wherein the shield contact element receptacle is arranged at an area of the mounting unit located opposite the receptacle for the holding section.

7. Cable feedthrough as defined in claim 1, wherein the mounting unit is securable to an inner wall of an opening of the wall section.

8. Cable feedthrough as defined in claim 1, wherein the mounting unit is securable to the wall section in a form locking manner.

9. Cable feedthrough as defined in claim 1, wherein the mounting unit passes through an opening in the wall section.

10. Cable feedthrough as defined in claim 1, wherein the mounting unit has elements engaging in the inner wall surface of the opening in a form locking manner.

11. Cable feedthrough as defined in claim 1, wherein the mounting unit is connectable to the wall section in an electrically conductive manner in the region of the opening.

12. Cable feedthrough as defined in claim 11, wherein the mounting unit is provided with elements providing the electrically conductive connection to the wall section and engaging in it.

13. Cable feedthrough as defined in claim 11, wherein the mounting unit is provided with elements providing the electrically conductive connection to the wall section and engaging in the inner wall of the opening.

14. Cable feedthrough as defined in claim 1, wherein the cable fixing member is arranged on the fixing housing outside of the holding section.

15. Cable feedthrough as defined in claim 14, wherein the cable fixing member is arranged on the fixing housing on a side located opposite the holding section.

16. Cable feedthrough as defined in claim 1, wherein the cable fixing member comprises a cap nut and a fin basket, wherein the fin basket is adapted to be acted upon by the cap nut in the direction of a cable running through the cable feedthrough and the cable is adapted to be clamped by the fin basket.

17. Cable feedthrough as defined in claim 16, wherein the fin basket surrounds an annular seal and the annular seal is adapted to be acted upon by the fin basket and abut on a cable as a result.

18. Cable feedthrough as defined in claim 1, wherein the shield contact element has an outer body, individual contact elements extending from said body in the direction of the central axis.

19. Cable feedthrough as defined in claim 1, wherein the shield contact element has contact brackets extending in the direction of the central axis.

20. Cable feedthrough comprising a cable fixing unit with a fixing housing provided with a cable fixing member and a holding section as well as a shield contact element making contact with a cable shield of a cable guided through the cable feedthrough, the cable feedthrough having a mounting unit connectable to a wall section of an appliance, the mounting unit is connectable or connected to the cable fixing unit in a form locking manner and the mounting unit being designed such that it provides an electrically conductive connection between the shield contact element and the wall section;

wherein the shield contact element is held on the mounting unit; and wherein the shield contact element is arranged on the mounting unit at an area located outside of a receptacle for the holding section.

* * * * *